United States Patent [19]

Heibel et al.

[11] Patent Number: 4,927,594
[45] Date of Patent: May 22, 1990

[54] THERMOCOUPLE BASED CONTROL ROD POSITION INDICATION SYSTEM

[75] Inventors: Michael D. Heibel, Plum Borough; Albert J. Impink, Jr., Murrysville Borough; Louis R. Grobmyer, North Huntingdon, all of Pa.

[73] Assignee: Westinghouse Electric Corp., Pittsburgh, Pa.

[21] Appl. No.: 230,393

[22] Filed: Aug. 10, 1988

[51] Int. Cl.$^5$ .............................................. G21C 17/00
[52] U.S. Cl. .................................. 376/258; 376/247; 376/259
[58] Field of Search ................. 376/258, 247, 259, 210

[56] References Cited

U.S. PATENT DOCUMENTS

| | | | |
|---|---|---|---|
| 3,810,138 | 5/1974 | Thompson et al. | 376/247 |
| 4,330,367 | 5/1982 | Musick | 376/245 |
| 4,400,343 | 8/1983 | Izumi et al. | 376/210 |
| 4,568,513 | 2/1986 | Book et al. | 376/245 |
| 4,585,609 | 4/1986 | Le Rat | 376/245 |
| 4,774,049 | 9/1988 | Impink, Jr. et al. | 376/247 |
| 4,774,050 | 9/1988 | Impink, Jr. | 376/247 |
| 4,839,134 | 6/1989 | Impink, Jr. et al. | 376/247 |

Primary Examiner—Daniel Wasil
Attorney, Agent, or Firm—B. R. Nath

[57] ABSTRACT

The present invention obtains enthalpy rise deviations in core power distribution using core exit thermocouples 18 and an inlet temperature detector 20. The enthalpy rise deviations are used to determine control rod position change relative a rod reference position. Because rod position change is linear with respect to enthalpy deviation, the change can be determined from the slope using the deviation. By adding the change to a reference rod position the actual rod position can be determined.

7 Claims, 4 Drawing Sheets

4,927,594

THERMOCOUPLE BASED CONTROL ROD POSITION INDICATION SYSTEM

CROSS REFERENCES TO RELATED APPLICATIONS

This application is related to U.S. Pat. Nos. 4,774,050, 4,774,049 and 4,839,134, all assigned to Westinghouse Electric Corporation and all incorporated by reference herein.

BACKGROUND OF THE INVENTION

1. Field of the Invention

The present invention is directed to utilizing measured X-Y deviations in assemblywise enthalpy rises, determined using incore thermocouples measuring the temperature of coolant exiting selected fuel assemblies, from established reference values and correlating the enthalpy rise deviations with rod control cluster axial positions in a nuclear reactor core to provide an on-line thermocouple based rod position indication system for a pressurized water nuclear reactor.

2. Description of the Related Art

Knowing the position of control rods in a nuclear core of a nuclear reactor is essential to the safe operation of a nuclear power plant as well as a legal requirement for continuation of an operating license. Currently rod position is determined using a coil stack that sits on top of the containment vessel in which the control rod drive shaft moves up and down. The magnetic impedance produced voltage output of the coil stack is proportional to the length of the rod drive shaft residing in the coil stack, thereby allowing rod position to be inferred through the voltage output of each coil stack. This type system is susceptible to calibration drift requiring periodic recalibration even when the rods are not moved. To determine the accuracy of this magnetic rod position inference system or analog rod position indication system and to recalibrate same, a movable incore detector system must be periodically used to detect the change in flux produced within the reactor caused by the damping action of the rod and to compare this approximate rod position, inferred using the incore detectors, with the rod position indicated by the magnetic inference system. Operating this incore detector system requires exposure of maintenance personnel to small amounts of radiation. This system also requires that a movable detector string be sufficiently close to the target rod to detect flux changes caused by the target rod. If rod position of the target rod cannot be verified, the rod must be considered inoperable. A reactor shutdown is necessary if more than one rod is considered inoperable.

SUMMARY OF THE INVENTION

It is an object of the present invention to provide an independent method of determining rod position in a nuclear reactor core.

It is another object of the present invention to reduce the duty cycle requirements of an incore detector system by supplementing the standard analog magnetic rod position indication system that performs a function very similar to the movable incore detector system, i.e. measuring the effect on neutron flux distribution of insertion of control rods in a pressurized water reactor core, and thereby reducing the radiation exposure of maintenance personnel.

It is also an object of the present invention to provide a backup to the analog system in the event that the analog system undergoes excessive calibration drift, thereby removing the need to shut down the reactor because of the drift problem.

It is an additional object of the present invention to save time in the power up process, thereby improving plant availability.

The above objects can be attained by a system which determines enthalpy rise deviations in core power distribution using core exit thermocouples to monitor temperature of coolant exiting selected fuel assemblies. The enthalpy rise deviations are used to determine rod position change relative to a rod reference position.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
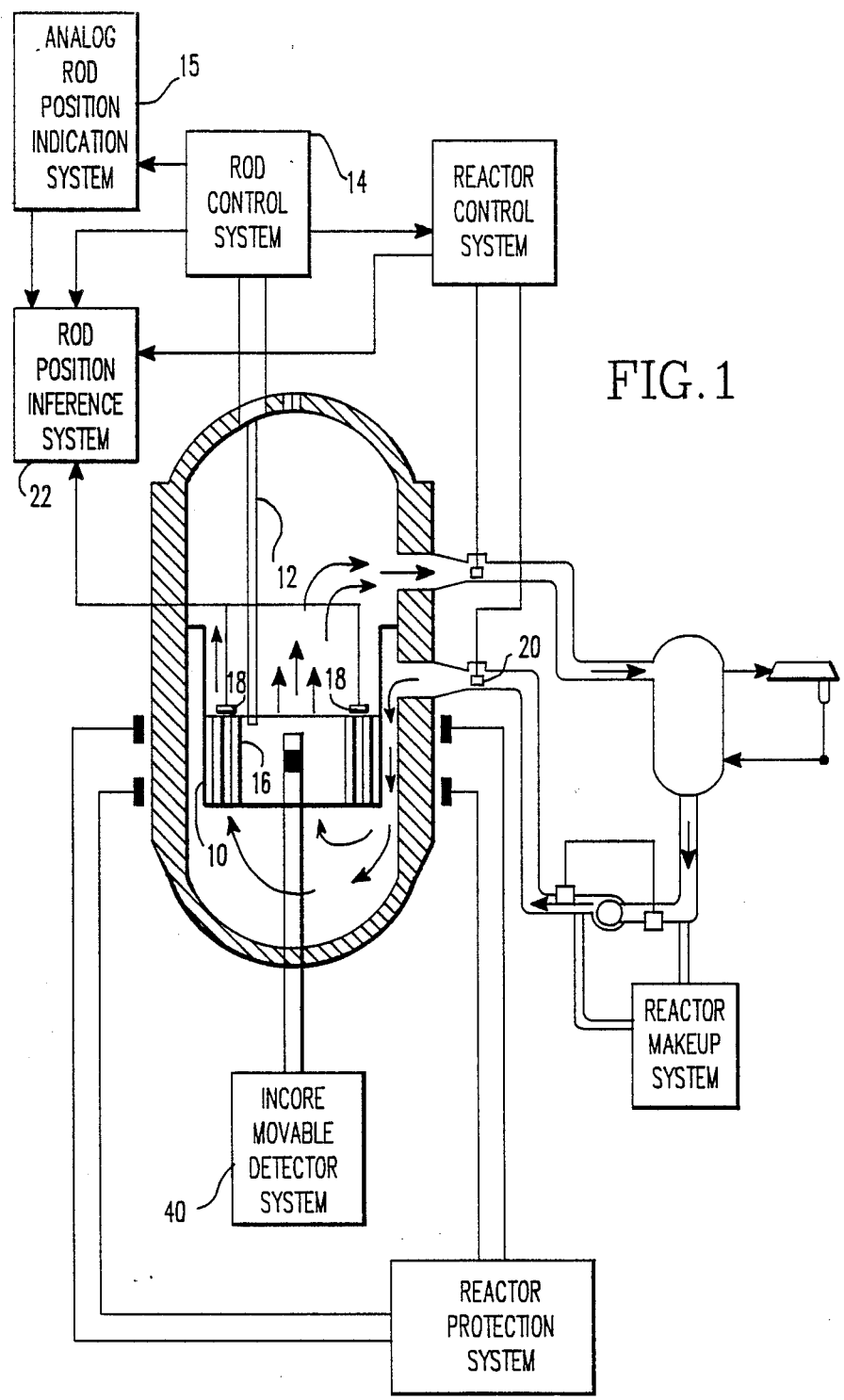
FIG. 1 illustrates the relationship of the present invention to a nuclear reactor.

Inserting control rods into a nuclear reactor core causes a change in the radial power distribution in the core. The changes in power distribution are correlated to enthalpy changes in the core. The present invention utilizes measured deviations in assemblywise enthalpy, determined using incore, thermocouples, from established reference values and correlates the deviations with rod axial positions to indicate rod position. The present invention provides an on-line, real time surveillance grade information system for determining rod position.

The system begins with rod reference positions produced by the analog rod position indication system. The thermocouple based rod position indications bootstrap from the analog position indications. The reference positions for the thermocouple rod position indications can be readjusted only on the basis of the analog rod position indications. When a new reference for the thermocouple based system has been established using the analog based system, the thermocouple based system can be used to detect and correct drift in individual analog rod position indications. The thermocouple based system can, however, operate in a fully freestanding mode. The thermocouple based system can be used to derive information to estimate the degree of insertion of any or all control rods in the core. However, because of the effects of, for example, power level (i.e. moderator density distribution), transient $^{135}$Xe concentration distribution and long term burn-up distribution changes, the precision of the control rod position indications derived strictly from the thermocouple signals is, at best, marginal for core surveillance purposes. By utilizing the "bootstrapping" approach, which uses groupwise analog based rod position indications to generate new references for the thermocouple based rod position indications as core conditions change and uses the thermocouple based system to, in effect, verify the continuing validity of the individual analog based rod positions (or to detect and qualify drift in the individual analog based positions) when core conditions are stable, at least as far as the thermocouples are concerned, the accuracies of both systems are greatly enhanced. The basic validity of the thermocouple rod position indications is guaranteed by periodic calibration of position against the results of flux maps made with the movable incore detector system and by the fact that the thermocouple system is passive (i.e. no moving parts).

The correlation between thermocouple temperature response and the core radial power distribution is established by normalizing the thermocouple calculated relative radial power distribution to the relative radial power distribution measured at a convenient reference power level and rod insertion configuration, using the movable incore power distribution measuring system. Once the thermocouple calculated relative radial power distribution is normalized to the actual radial power distribution at a reference power and rod configuration, an accurate correlation between the thermocouple response and rod position may be established. As rods are moved about their established reference positions, the fuel assembly relative powers change from their established reference relative values. Establishing the correlations between the change in normalized thermocouple calculated assembly relative power from established reference values and the change in rod position allows the thermocouples to be used to accurately determine rod positions.

A reactor core 10, as illustrated in FIG. 1, includes control rods 12 inserted into the core 10 by a rod control system 14 to control power output. An analog rod position indication system 15 produces rod positions magnetically as previously discussed. Cooling water is forced through the rod fuel assemblies 16 and past in-core thermocouples 18. Preferably, the temperature measured by each thermocouple 18 is sampled once a second and a thirty sample moving average is used as the temperature in the enthalpy calculations. It is thus possible to determine rod position once a second, however, a rod position determination every 10 seconds is acceptable. Assemblywise enthalpy changes are determined using the outputs of the thermocouples 18 and the output from an inlet resistance temperature detector 20 by the rod position inference system 22. A detailed description of determining enthalpy rise can be found in U.S. Pat. Nos. 4,774,050 and 4,774,049 incorporated by reference herein. A system available from Westinghouse Electric Corporation called the COSMOS system is also available to determine enthalpy rises and deviations. Enthalpy rise deviations from a reference are then used to determine rod position as will be discussed in more detail later.

Figure 2:
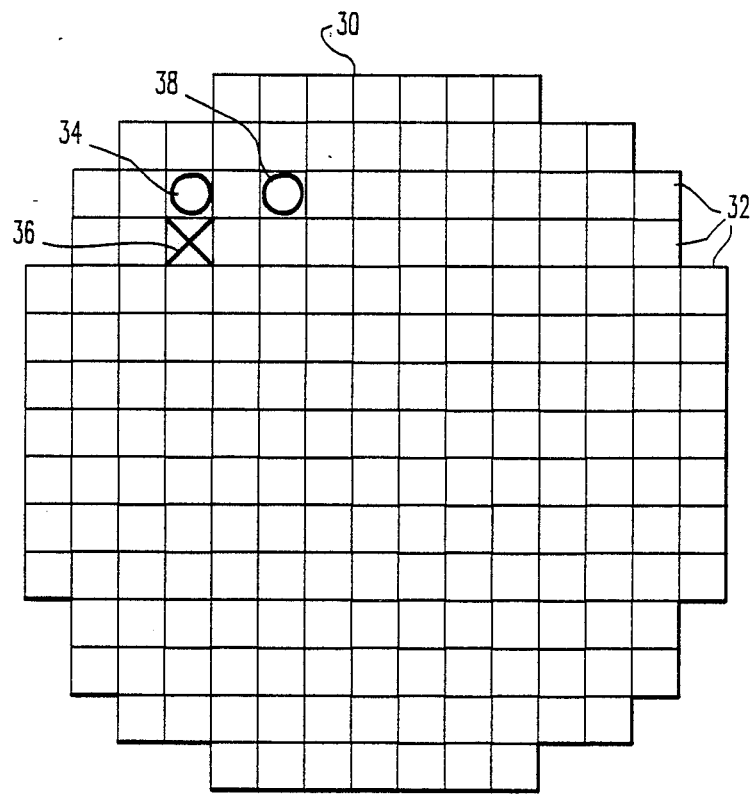
FIG. 2 illustrates the relationship between core exit thermocouples and control rod positions.

FIG. 2 represents a top view of a reactor core assembly 30 where individual rod assemblies 32 are represented as squares. When the enthalpy deviation of a core assembly is determined using a thermocouple 34 as illustrated in FIG. 2 in the M03 position, the position of a rod 36 in an adjacent position such as M04 can be determined. It is not critical, though it is preferred, that the measuring thermocouple be adjacent to the rod whose position is being determined as illustrated in FIG. 2. A peripheral thermocouple alone cannot be used unless it is adjacent to the target rod assembly 36 because of errors in temperature measurements caused by the temperature change resolution limits of the in-core thermocouples. At a minimum, a thermocouple 38 is preferably within a knights-move of the target rod assembly 36. If a knights-move thermocouple is used, it is also preferred that at a minimum two such thermocouples be used by combining the positions produced by averaging. Optimally, the positions determined by two adjacent thermocouples and two non-peripheral knights-move thermocouples should be combined. A more practical optimum is to use one adjacent and one non-peripheral knights-move thermocouple. A weighing scheme which will allow the use of non-adjacent thermocouples is described in U.S. Pat. No. 4,839,134. Rod position change relative to a reference position is determined with respect to equations 1-3 below:

$$\Delta R = \partial R/\partial \Delta hmi \{(\Delta hmi - Bi \, \Delta hmiR) - Di \, \partial \Delta h/\partial Q \, \Delta Q \} \quad (1)$$

$$Di = \Delta hmiR/\Delta hR - \Delta hmi/\Delta h \quad (2)$$

$$Bi = \Delta h/\Delta hR \quad (3)$$

Figure 4:
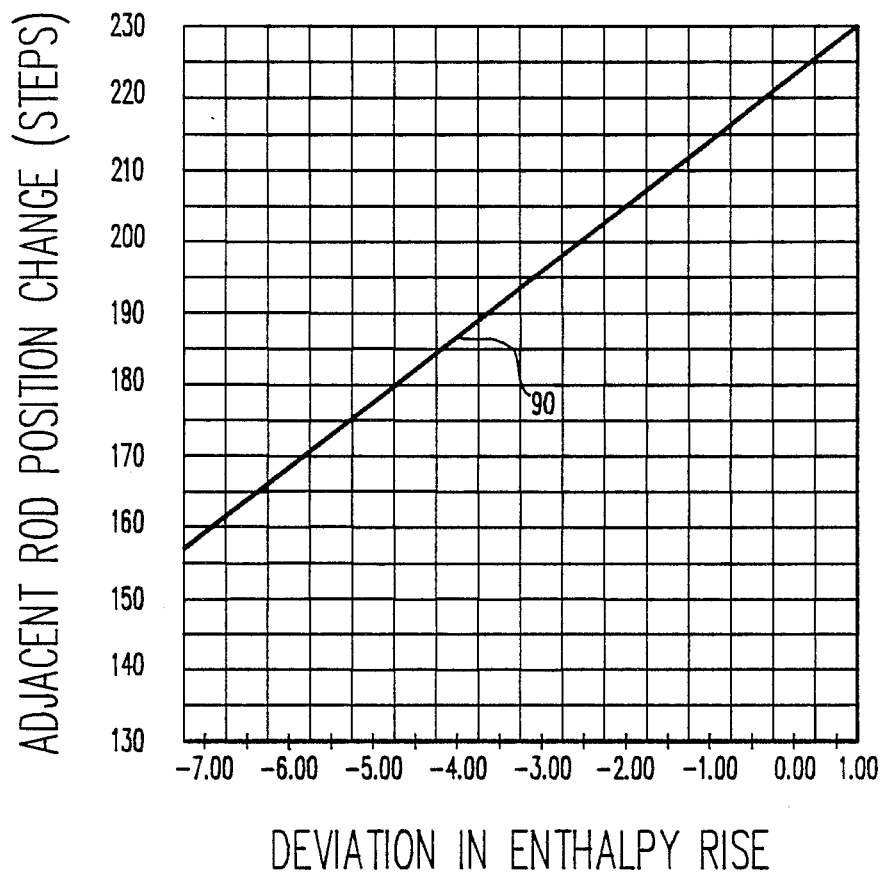
FIG. 4 illustrates the relationship between deviations in enthalpy rise and changes in rod position.

As will be seen with respect to FIG. 4, in these equations the relationship between thermocouple relative assembly power and rod demand position is observed to be essentially linear. In the above equations, $\Delta hmi$ is the thermocouple measured assembly enthalpy rise for location i, where $\Delta hmiR$ is the reference enthalpy rise, $\Delta h$ is the resistance temperature detector measured enthalpy rise in the reactor coolant system loop most closely associated with the core quadrant containing the measuring thermocouple, $\Delta hR$ is a reference resistance temperature detector measured enthalpy in the reactor control system loop most closely associated with the core quadrant containing the measuring thermocouple, and $\Delta Q$ is the change in percent of full power being produced by the reactor control system most closely associated with the core quadrant containing the measuring thermocouple. The term Bi scales the enthalpy rise based on changes in boron concentration in the cooling fluid. The term Di represents the change in reference relationship between $\Delta hmi$ and $\Delta h$ that would be observed, with rod position held constant, due to the change in quadrant power distribution. The term Di cannot be measured directly. In order to obtain an accurate relationship between rod position and the measured enthalpy rises, the value of Di must be kept at, or very close to zero. This can be accomplished by updating the reference values when a core power distribution perturbation occurs which causes $\Delta hmi/\Delta h$ to deviate significantly from the previous reference condition. This update in reference values can also occur each time a group rod is moved or once every ten minutes. If the value of Di is kept at or near zero by such frequent updating, the expression for determining the change in rod position becomes as illustrated in equations 4 and 5 below. These calculations preferably use double precision arithmetic and have 16 bits available for input values. Once the change $\Delta Rj$ in rod position is known the actual position can be determined by adding the change $\Delta Rj$ to a reference rod position.

$$\Delta Rj = Ki \, (\Delta hmi - Bi \, \Delta hmiR) \quad (4)$$

$$Ki = \partial R/\partial F\Delta hmi = (mi/\Delta h100) \, \partial R/\partial fi \quad (5)$$

where j is the rod control cluster assembly identifier, i is the thermocouple identifier, mi is the thermocouple flow mixing factor (a factor which makes the thermocouple determined assembly power agree with the relative assembly power determined using the incore system), $\Delta h100$ is one hundred percent of full reactor power core enthalpy rise, $\partial R/\partial fi$ is the slope of the relation between the change in rod control cluster assembly j position and the change in the Nuclear Design Prediction (produced for every reactor) of the relative assembly power in the core location of thermocouple i, and the value of Ki or the slope of the rod position change relative to enthalpy rise deviation may be determined via a least squares fit of observed values of rod position change verses the corresponding values of $\Delta hmi - Bi \cdot \Delta Rmi$ during rod position changes in an operating reactor. The Westinghouse COSMOS system can be used during a power escalation for rod position change determinations as well as the enthalpy and position calculations discussed above. Once the actual rod position is determined the rod position is then used as the reference rod position in the next cycle of position determination calculations. These determinations can be made by a person of ordinary skill, during a reactor power escalation during start up or during routine maintenance and calibration. The value of Ki may also be determined by a person of ordinary skill from the design predictions of the change in relative assembly power going from the unrodded to a rod bank fully inserted configuration in the nuclear design report required for each nuclear power reactor. The value of Ki may be updated, as required, during the reactor cycle with data obtained during an analog rod position indication operability surveillance test, however, Ki should be updated at least once a month.

Figure 3:
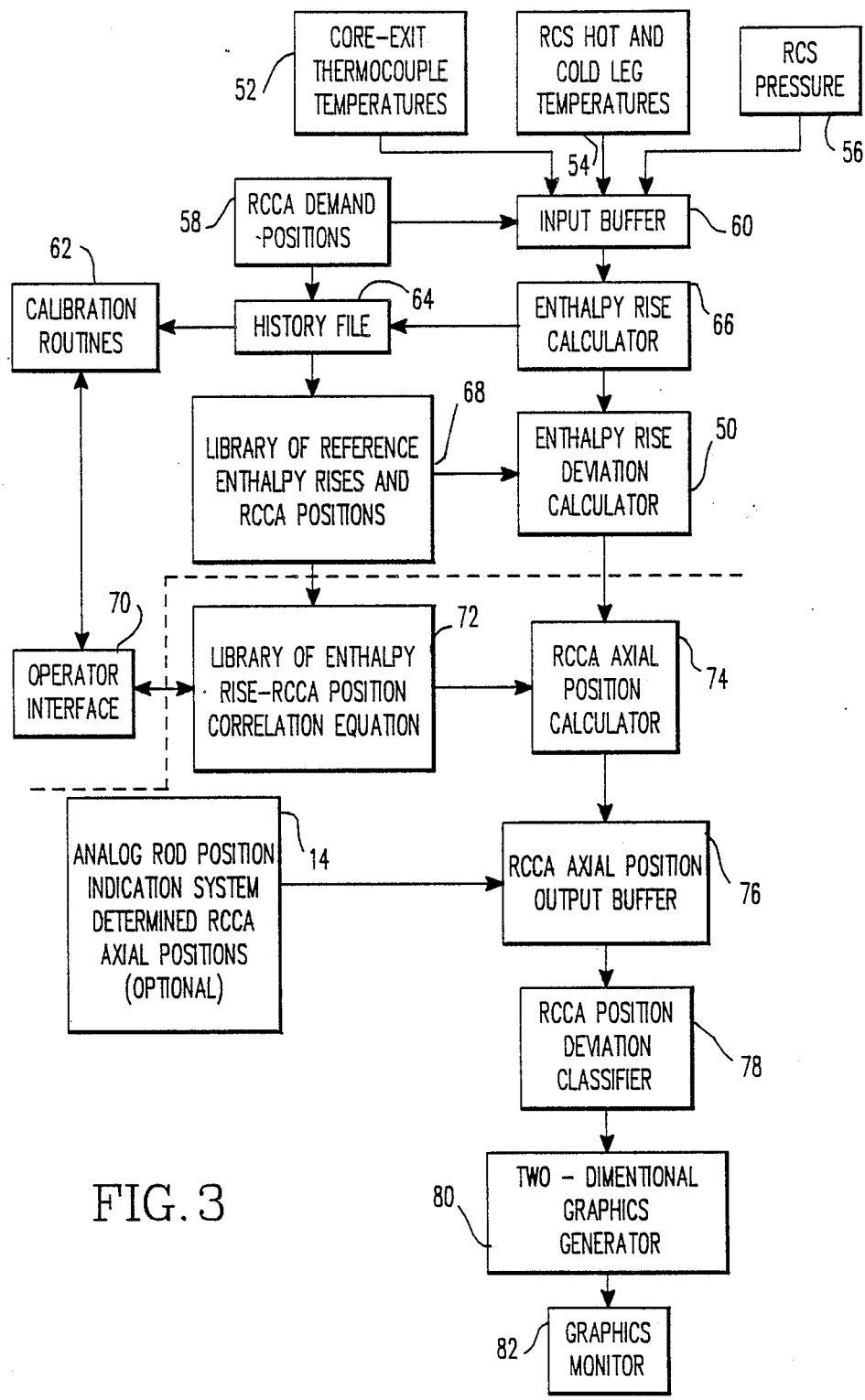
FIG. 3 illustrates the sequence of calculations performed in the present invention.

FIG. 3 illustrates the computations and input sources necessary to determine rod position in accordance with the present invention. In FIG. 3, the operation of everything above the dashed line is illustrated in FIG. 6 in U.S. Pat. No. 4,774,049 incorporated by reference herein, where the enthalpy rise deviation calculator 50 in FIG. 3 corresponds to the block with reference number 92 in FIG. 6 in the above-identified incorporated patent. Once the enthalpy rise is determined the rod control cluster assembly position calculator 74 which is preferably a digital computer, such as in the COSMOS system, executes equation 4 for each rod position change to be determined. The library indicated as reference numeral 72 stores the Ki's and Bi's used by equation 4 to calculate the axial position of the control and-/or shutdown rods. The change is added to the reference position to determine rod position. Once rod position has been determined a buffering device 76 such as the memory of the computer is used to store the thermocouple calculated rod positions as well as the analog rod position indication system 15 positions or rod control system 14 demand positions. These positions are compared by subtraction in a position deviation calculator 78 which can be a simple subtraction equation for a rod Rj and a two-dimensional graphics generator 80 is used to display the differences between the two rod position indication systems on a conventional monitor 82. It is also possible to use equation 4 to precompute a conversion table, as represented by the transform graph of FIG. 4 which will allow a substantially instantaneous conversion of deviation in enthalpy rise for a particular position into change in rod position. As will be noted from FIG. 4 change in rod position and enthalpy deviation are linearly related and as a result once the slope Ki is known for a particular rod and the initial reference position of the rod is known, any later position can be determined quite easily from the enthalpy deviation. It is also possible to merely output the enthalpy deviation associated with the control rod and allow the operator to determine rod position from a curve 90 on a graph such as illustrated in FIG. 4.

Using thermocouples for rod position indication allows a system with a rod position accuracy of plus or minus twelve steps to be is easily obtainable while an accuracy of plus or minus 1.7 steps is possible with a 0.5° C. resolution thermocouple and 14 bits of sample resolution.

The present invention is particularly useful after the reactor has been brought up to a significant fraction of full reactor power, for example thirty percent, where the measured enthalpy rises become large enough to provide stable inputs for the rod position calculations. The present system will allow the operator to ignore rod misalignment indications produced by the analog position sensing system 15 and would eliminate the need for the calculations required for such a system over a substantial portion of the full rod travel length. The only analog calculations then necessary would be in the region below the thirty percent level where the present system suffers from some degree of inaccuracy. Because the costly (timewise) analog determinations can be eliminated the reactor can be brought up to a particular power setting more rapidly which translates into dollar savings in replacement power costs.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

We claim:

1. A rod position determination system, comprising:
   enthalpy means for determining a deviation in enthalpy rise from a reference for a core X-Y position; and
   rod position determination means for determining an actual axial rod position of a control rod from the enthalpy rise deviation.

2. A rod position determination system, comprising:
   enthalpy means for determining a deviation in enthalpy rise from a reference for a core X-Y position; and
   rod position determination means for determining an actual rod position of a control rod from the enthalpy rise deviation, said determination means making rod position change $\Delta Rj$ determinations in accordance with $Bi = \Delta h / \Delta hR$ $\Delta Rj = Ki (\Delta hmi - Bi \cdot \Delta hmiR)$ $Ki = \partial / \partial \Delta hmi = (mi/\Delta h100) \cdot \partial R/\partial fi$ where $\Delta h$ is a resistance temperature detector measured enthalpy rise, $\Delta hR$ is a reference resistance temperature detector measured enthalpy, $\Delta hmi$ is measured enthalpy rise, $\Delta h100$ is one hundred percent of full reactor power core enthalpy rise, $\partial R/\partial fi$ is the slope of the relation between the change in rod control cluster assembly j position and the change in the nuclear design prediction of the relative assembly power in the core location of thermocouple i, $\Delta hmiR$ is an incore measured reference enthalpy rise, mi is the thermocouple flow mixing factor, j is the rod control cluster identifier and i si the thermocouple identifier.

3. A system as recited in claim 2, wherein enthalpy rise deviation is determined using incore thermocouples.

4. A rod position indication system, comprising:
an incore thermocouple associated with a control rod measuring core coolant exit temperature;
a core coolant inlet temperature detector measuring core coolant inlet temperature;
enthalpy deviation means for determining enthalpy rise $\Delta hmi$ from the inlet and exit temperatures and a reference $\Delta hmiR$;
rod position means for determining rod position change $\Delta Rj$ in accordance with $Bi = \Delta h/\Delta hR$ $\Delta Rj = Ki\,(\Delta hmi - Bi\cdot\Delta hmiR)$ $Ki = \partial R/\partial \Delta hmi = (mi/\Delta h100)\cdot\partial R/\partial fi$ where $\Delta h$ is a resistance temperature detector measured enthalpy rise and $\Delta hR$ is a reference resistance temperature detector measured enthalpy, $\Delta hmi$ is measured enthalpy rise, $\Delta h100$ is one hundred percent of full reactor power core enthalpy rise, $\partial R/\partial fi$ is the slope of the relation between the change in rod control cluster assembly j position and the change in the nuclear design prediction of the relative assembly power in the core location of thermocouple i, $\Delta hmiR$ is an incore measured reference enthalpy rise, mi is the thermocouple flow mixing factor, j is the rod control cluster identifier and i is the thermocouple identifier, and for determining rod position from the change and a rod reference position.

5. A rod position determination method, comprising the steps of:
(a) determining an enthalpy rise deviation associated with a rod assembly; and
(b) determining an actual axial rod position of a control rod from the enthalpy rise deviation.

6. A method as recited in claim 5, wherein step (a) includes the steps of:
(ai) determining a reference enthalpy rise; and
(aii) determining enthalpy rise deviation relative to the reference enthalpy rise.

7. A rod position determination method comprising the steps of:
(a) measuring core coolant inlet temperature;
(b) measuring core coolant assembly exit temperature associated with a control rod;
(c) determining enthalpy rise from the inlet and exit temperature and a reference for an assembly containing the rod;
(d) determining rod position change $\Delta Rj$ from $Bi = \Delta h/\Delta hR$ $\Delta Rj = Ki\,(\Delta hmi - Bi\cdot\Delta hmiR)$ $Ki = \partial R/\partial \Delta hmi = (mi/\Delta h100)\cdot\partial R/\partial fi$ where $\Delta h$ is a resistance temperature detector measured enthalpy rise, $\Delta hR$ is a reference resistance temperature detector measured enthalpy, $F\Delta hmi$ is measured enthalpy rise, $\Delta h100$ is one hundred percent of full reactor power core enthalpy rise, $\partial R/\partial fi$ is the slope of the relation between the change in rod control cluster assembly j position and the change in the nuclear design prediction of the relative assembly power in the core location of thermocouple i, $\Delta hmiR$ is an incore measured reference enthalpy rise, mi is the thermocouple flow mixing factor, j is the rod control cluster identifier and i is the thermocouple identifier; and
(e) determining rod position from the rod position change and a reference rod position.

* * * * *